(12) United States Patent
Wolf

(10) Patent No.: US 12,330,216 B2
(45) Date of Patent: Jun. 17, 2025

(54) METHOD FOR AVOIDING RESONANCE DAMAGE DURING CLEANING OF AN AT LEAST PARTLY ADDITIVELY MANUFACTURED COMPONENT, CLEANING DEVICE, MASS ELEMENT, AND SYSTEM

(71) Applicant: MTU Aero Engines AG, Munich (DE)

(72) Inventor: Kaspar Wolf, Munich (DE)

(73) Assignee: MTU Aero Engines AG, Munich (DE)

( * ) Notice: Subject to any disclaimer, the term of this patent is extended or adjusted under 35 U.S.C. 154(b) by 82 days.

(21) Appl. No.: 18/276,213

(22) PCT Filed: Jan. 27, 2022

(86) PCT No.: PCT/DE2022/100070
§ 371 (c)(1),
(2) Date: Aug. 7, 2023

(87) PCT Pub. No.: WO2022/171234
PCT Pub. Date: Aug. 18, 2022

(65) Prior Publication Data
US 2024/0091861 A1    Mar. 21, 2024

(30) Foreign Application Priority Data
Feb. 9, 2021    (DE) ..................... 10 2021 201 169.1

(51) Int. Cl.
*B22F 10/68*    (2021.01)
*B29C 64/35*    (2017.01)
(Continued)

(52) U.S. Cl.
CPC .............. *B22F 10/68* (2021.01); *B29C 64/35* (2017.08); *B33Y 40/20* (2020.01); *B33Y 50/02* (2014.12); *B29L 2031/7504* (2013.01)

(58) Field of Classification Search
CPC ......... B29C 64/30; B29C 64/35; B22F 10/68; B33Y 40/20
See application file for complete search history.

(56) References Cited

U.S. PATENT DOCUMENTS

2015/0266157 A1*  9/2015  Summers ............... B33Y 40/00
                                                          451/113
2015/0266158 A1*  9/2015  Summers .............. B24B 27/033
                                                          29/564.7
(Continued)

FOREIGN PATENT DOCUMENTS

CN        110681947 A    1/2020
DE    102007039548 B3    1/2009
(Continued)

*Primary Examiner* — Nahida Sultana
(74) *Attorney, Agent, or Firm* — Hinckley, Allen & Snyder, LLP; David Josephs

(57) ABSTRACT

The invention is directed to a method for cleaning powder residues of an additive layer build-up method away from an at least partly additively manufactured component by a cleaning device, wherein a machine plate and the component arranged thereon are excited to mechanical oscillation during a cleaning process by a vibration actuator of the cleaning device with a set resonant frequency of the machine plate. According to the invention, before the cleaning process is carried out, a resonant frequency of the machine plate is set to the set resonant frequency by an arrangement of a mass element on a securing element of the machine plate.

8 Claims, 2 Drawing Sheets

Figure 1:
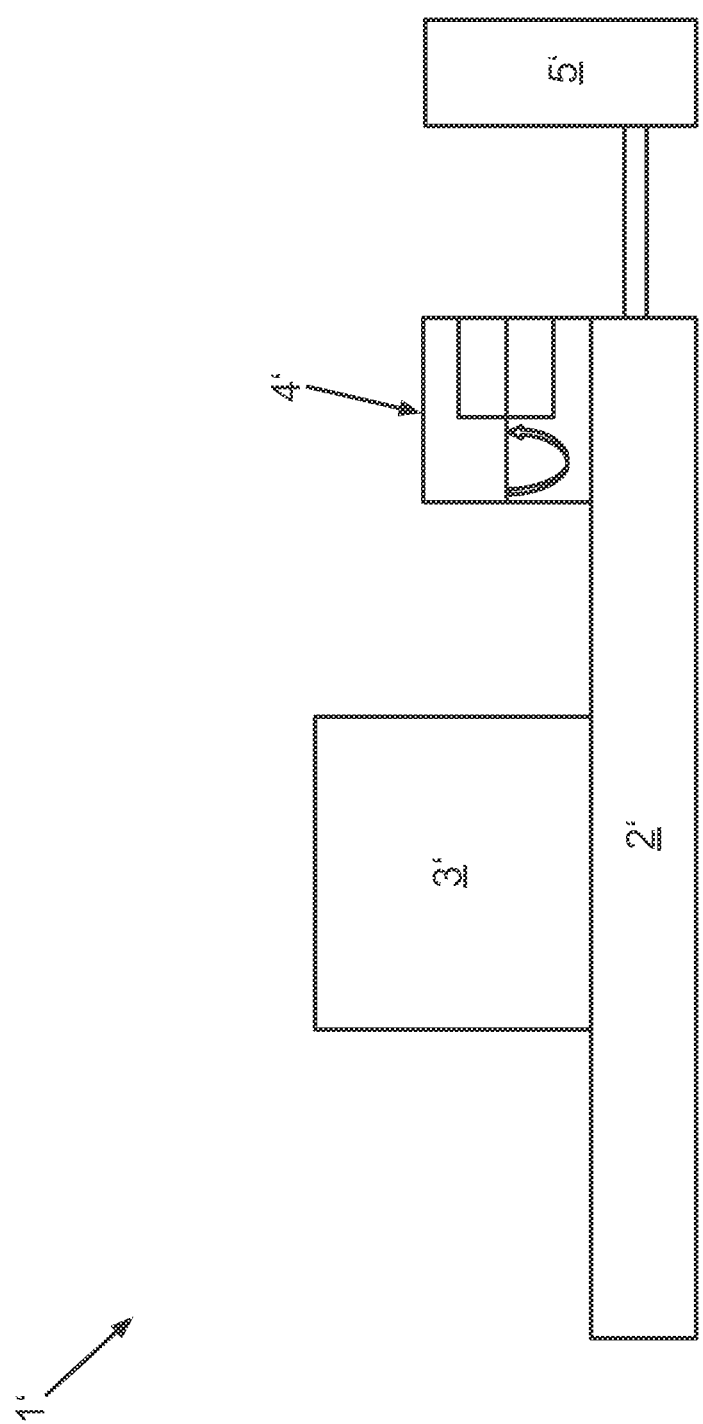

(51) Int. Cl.
  *B29L 31/00*   (2006.01)
  *B33Y 40/20*   (2020.01)
  *B33Y 50/02*   (2015.01)

(56) References Cited

U.S. PATENT DOCUMENTS

2015/0266211 A1* 9/2015 Wolfgang .............. B33Y 40/20
                                                    425/424
2017/0217094 A1   8/2017 Oswald et al.
2018/0126620 A1   5/2018 Talgorn et al.
2019/0234908 A1   8/2019 Meile et al.
2020/0057030 A1   2/2020 Hartwig et al.

FOREIGN PATENT DOCUMENTS

DE   102016109212 A1   11/2017
DE   102017115043 A1    1/2018
EP       3575090 A1    4/2019
EP       3533538 A1    9/2019
EP       3383627 B1    8/2020

* cited by examiner

METHOD FOR AVOIDING RESONANCE DAMAGE DURING CLEANING OF AN AT LEAST PARTLY ADDITIVELY MANUFACTURED COMPONENT, CLEANING DEVICE, MASS ELEMENT, AND SYSTEM

BACKGROUND OF THE INVENTION

Additive layer buildup methods refer to processes in which, on the basis of a virtual model of a component or component region to be manufactured, geometric data are decomposed or sliced to create layer data. Depending on the geometry of the model, an exposure or irradiation strategy is determined, according to which the selective solidification of a material shall be produced. In the layer buildup method, the chosen material is then deposited layer by layer and scanned and solidified selectively by means of an energy beam in order to build up the component additively layer by layer. Various irradiation parameters, such as, for example, the power of the energy beam and the irradiation speed of an energy beam that is to be used for the solidification are of importance for the resulting microstructure. In addition, the arrangement of so-called scan lines is also of importance. The scan lines, which may also be referred to as individual tracks, melting tracks, or irradiation vectors, define the paths along which the at least one energy beam scans and melts the material and, in general, can extend linearly or nonlinearly. Accordingly, additive or generative manufacturing methods differ from conventional material-removing or original manufacturing methods. Examples of additive manufacturing methods are generative laser sintering and laser melting methods, which, for example, can be used for the manufacture of components for turbomachines, such as aircraft engines. In selective laser melting, thin layers of powder of the material or of the materials used are deposited on a build platform and melted and solidified locally in the region of the buildup and joining zone by using one laser beam or a plurality of laser beams. Subsequently, the build platform is lowered and a further layer of powder is deposited and solidified locally once again. This cycle is repeated until the finished component or the finished component region is obtained. The component can be further processed subsequently, as need be, or it can be used without further processing steps. In selective laser sintering, the component is manufactured in a similar way by laser-assisted sintering of powdered materials. The supply of energy is provided here, for example, by laser beams of a $CO_2$ laser, a Nd:YAG laser, a Yb fiber laser, a diode laser, or the like. Also known are electron beam methods in which the material is scanned and solidified selectively by one electron beam or by a plurality of electron beams.

In additive layer buildup methods in which the material is deposited as a powder, non-melted powder residues can adhere on an at least partly additively manufactured component. For this reason, it is necessary, after the conclusion of the layer buildup method, to clean the powder away from the at least partly additively manufactured component. This can be conducted manually, for example, by means of a compressed air blower. The manual cleaning of additively manufactured components has the drawback, however, in that it is associated with a high expenditure of time, which, particularly in the case of mass production, can lead to increased costs of the manufactured components.

In order to make possible a higher degree of automation in the manufacture of components by means of additive layer buildup methods, therefore, it is widespread practice to clean powder residues away from the finished components by means of cleaning devices. Said cleaning devices excite oscillations in the component, as a result of which the powder residues adhering to the component are released. In this case, the powder residues are conventionally gathered in a collecting device of the cleaning device in order to be supplied in later additive manufacturing processes. The cleaning operations can be carried out in airtight protective chambers, as a result of which it is possible to prevent any spread of dust hazardous to health into the surroundings. It is also possible to fill these protective chambers with a predetermined atmospheric gas in order to prevent reactions in the case of reactive powders.

One problem involved in the cleaning operations by cleaning devices ensues from the excitation of oscillations in the component. The oscillations are generated, as a rule, in that the machine plate on which the component is arranged is set into oscillation by a vibration actuator, which is generally designed as an unbalancer. This excitation occurs at an excitation frequency that matches a resonant frequency of the machine plate or of the system consisting of the machine plate and the component. It can thereby transpire that this excitation frequency comes close to the resonant frequency of the component or matches it. The resonances that are thereby induced in the component can lead to damage to the component.

US 2019/0234908 A1 discloses a method for the analysis of an additively manufactured object. In the method, it is provided that a vibrational behavior of the manufactured object is recorded depending on one frequency. For this purpose, the object is induced to undergo a body oscillation in a predetermined frequency range by way of an excitation of the body oscillation by a test signal. The body oscillation induced in the object is recorded and compared to a vibrational behavior that was determined by means of a simulation. Through the comparison of the measured vibrational behavior of the object to the simulated vibrational behavior of the object, a state of the object is deduced.

In US 2018/0126620 A1, a 3D printing device is disclosed. The 3D printing device has a printer nozzle for applying material onto a holding structure in order to manufacture a 3D object. The printer nozzle and the holding structure are arranged in such a way that they can travel relative to each other in a translation direction at a translation speed. The 3D printer device has a vibrational actuator that is designed to bring about a vibrational movement of a first part of the holding structure relative to the printer nozzle, said vibrational movement occurring in a different direction than the translation direction.

Disclosed in US 2020/0057030 A1 are a system and a method for inspecting components by means of dynamic response functions. In this case, it is provided that an additively manufactured structure is excited with an excitation force, which, in particular, can be a vibration, by way of an input mechanism. It is provided that the dynamic response brought about by the excitation in the component is recorded by an output mechanism. By way of a processor, any defect in the component is recorded on the basis of a ratio between the response and the excitation of the component.

Disclosed in CN 110681947A is a method in which an additive manufacturing method is assisted by a resonance investigation.

SUMMARY OF THE INVENTION

It is an object of the invention to prevent any occurrence of resonance damage in at least partly additively manufactured components during a cleaning process.

The invention relates to a method for avoiding resonance damage during a cleaning of powder residues of an additive layer buildup method away from an at least partly additively manufactured component by means of a cleaning device. The component may involve, in particular, a component of a turbomachine. The powder residues can comprise metallic and/or nonmetallic portions. In the method, it is provided that a machine plate and the at least partly additively manufactured component arranged thereon are excited to mechanical oscillation during a cleaning process by a vibration actuator of the cleaning device with a set resonant frequency of the machine plate in order to release the powder residues from the at least partly additively manufactured component. In other words, it is provided that the at least partly additively manufactured component on which the powder residues are found is arranged on a machine plate of the cleaning device. The arrangement can comprise, for example, a locking, clamping, or bolting of the component onto the machine plate. In order to make possible a release of the powder residues from the component, the machine plate is excited to oscillation, which is transmitted to the component. For this purpose, the machine plate is excited by the vibration actuator of the cleaning device with the set resonant frequency of the machine plate. The machine plate of the cleaning device and the at least partly additively manufactured component arranged thereon are pivoted around at least one axis during the predetermined cleaning process by means of a pivoting apparatus of the cleaning device in order to make it possible for the powder residue to flow away from the at least partly additively manufactured component. In other words, it is provided that the machine plate is arranged on a pivoting apparatus, by means of which the machine plate can be pivoted during the cleaning process. By way of the pivoting, the machine plate, together with the at least partly additively manufactured component arranged thereon, rotates around one axis or a plurality of axes. The pivoting process can comprise pivots in predetermined pivoting movements, which, can be dependent on the geometry of the component. In this way, it may be possible for the powder residues to flow away from the at least partly additively manufactured component in that the powder residues are able to flow away out of openings and/or channels of the component.

In the method, it is provided that, before the cleaning process is carried out, a resonant frequency of the machine plate is set to the set resonant frequency by an arrangement of a mass element on a securing element of the machine plate. In other words, it is provided that the resonant frequency of the machine plate is changed, so that it has the set resonant frequency. The setting of the resonant frequency to the set resonant frequency is conducted by arranging a mass element on the securing element of the machine plate. The securing element of the machine plate can comprise, for example, a locking, clamping, or bolting device in which the mass element can be arranged and secured. The mass element can have a predetermined geometry and/or a predetermined mass, which is chosen in such a way that the resonant frequency of the machine plate changes, so that it has the set resonant frequency.

It is provided that the set resonant frequency is determined according to a predetermined selection method depending on at least one resonant frequency of the component. In other words, the set resonant frequency is determined depending on the at least one resonant frequency of the component by means of the predetermined selection method. The selection method can involve, in particular, a computation method and/or a simulation method that is determined by means of a computing device. The set resonant frequency of the machine plate has a greater margin separating it from the at least one resonant frequency of the at least partly additively manufactured component than does the resonant frequency of the machine plate without the arranged mass element. In other words, the set resonant frequency is chosen in such a way that it has a greater difference from the resonant frequency of the component than the unchanged resonant frequency of the machine plate. Owing to the greater difference, the magnitude of the resonance in the component for the at least one resonant frequency of the component can be reduced. In this way, it is possible to prevent or minimize damage or material influences that can be brought about through resonances at the at least one resonant frequency of the component.

At least one parameter of the mass element is ascertained according to a predetermined ascertaining method depending on the set resonant frequency of the machine plate. The at least one parameter can involve, for example, a geometric value, a density, a mass, or a material of the mass element to be used. The ascertaining method can comprise, for example, a predetermined computation method or simulation method that determines the value of the at least one parameter of the mass element by which the set resonant frequency is attained.

A further development of the invention provides that the at least one resonant frequency of the at least partly additively manufactured component is determined by the cleaning device by way of a predetermined resonance recording method. In other words, the at least one resonant frequency is determined experimentally by the cleaning device according to the predetermined resonance recording method. It is thereby provided that the resonance recording method comprises the recording of a respective value of a resonance parameter of the at least partly additively manufactured component for at least two excitation frequencies of the vibration actuator by way of at least one sensor. In other words, it is provided that the resonance recording method provides that the machine plate, together with the at least partly additively manufactured component arranged thereon, is excited at least at two excitation frequencies. For the two excitation frequencies, a respective value of the resonance parameter is recorded by the at least one sensor. For example, it can be provided that at least two different excitation frequencies are set at the vibration actuator and a vibration is recorded by means of the sensor, which, for example, can comprise a piezo element. For example, the resonance parameter can, describe an amplitude of the oscillation occurring on the component or on the machine plate or a phase position for the respective excitation frequency. It can be provided that, for recording the at least one resonant frequency, a so-called frequency sweep occurs. In this process, a predetermined frequency range of the excitation frequency of the vibration actuator is swept using predetermined step sizes. The value of the resonance parameter can thereby by recorded for each step, so that a plot of values of the resonance parameter versus the excitation frequency can be created. On the basis of the plot, the at least one resonant frequency of the component can be determined according to predetermined methods. This can take place, for example, in a computing device of the cleaning device. The computing unit of the cleaning device can be designed to take into account solely the resonance characteristic of the machine plate, so that a distribution of the resonant frequencies of the machine plate and of the at least one resonant frequency of the component can result. In this way, there ensues the advantage that the at least one resonant frequency can be determined experimentally and in an automated manner by the cleaning device. In this way, it is possible to dispense with manual specifications of the at least one resonant frequency of the component.

A further development of the invention provides that the selection method for choosing the set resonant frequency is carried out by a computing unit of the cleaning device. In other words, by way of the computing unit, the set resonant frequency is chosen according to the predetermined selection method. It can be provided, for example, that a predetermined absolute or relative margin is prespecified and chosen and, depending on it, the set resonant frequency is chosen.

A further development of the invention provides that the at least one parameter comprises a position of a weight element of the mass element, with the position of the weight element being set by an actuator of the cleaning device. In other words, it is provided that the set resonant frequency is set by guiding the weight element arranged on the mass element to a predetermined position by the actuator. It can be provided, for example, that the mass element has a rail or a carriage, on which the weight element is arranged in such a way that, for example, it can be moved along a certain direction by the actuator. The computing unit of the cleaning device can control the actuator in such a way that the weight is moved to the predetermined position.

The invention also comprises a cleaning device for cleaning powder residues of an additive layer buildup method away from an at least partly additively manufactured component, in particular a component of a turbomachine. The cleaning device is designed, by way of an actuator of the cleaning device, to excite a machine plate of the cleaning device and the at least partly additively manufactured component arranged thereon to mechanical oscillation with a set resonant frequency of the machine plate during a cleaning process, so as to release the powder residues from the at least partly additively manufactured component, and, by way of a pivoting apparatus of the cleaning device, to pivot the machine plate of the cleaning device and the at least partly additively manufactured component arranged thereon during the predetermined cleaning process around at least one axis, so as to make it possible for the powder residues to flow away from the at least partly additively manufactured component. It is provided that the machine plate has a securing element for arranging a mass element for setting the set resonant frequency of the machine plate. The securing element can be arranged, for example, on a front face of the machine plate and have locking, bolting, or clamping devices in order to make it possible to secure in place the mass element of a machine plate.

The invention also comprises a mass element for arranging a cleaning device on a securing element of a machine plate for cleaning an at least partly additively manufactured component. The mass element can comprise, for example, a plate of predetermined dimensions, on which a weight is arranged. The mass element can have holes or guide elements in order to make it possible to secure the mass element in the securing element of the machine plate of the cleaning device.

The invention also comprises a system that comprises a cleaning device and at least one mass element. The system can have a plurality of mass elements, which differ from one another in terms of their geometric dimensions and/or their weight. In this way, it is possible, through a choice of the mass element, to set a respective set resonant frequency of the machine plate of the cleaning device.

BRIEF DESCRIPTION OF THE DRAWING FIGURES

Further features of the invention ensue from the claims, the figures, and the figure descriptions. The features and combinations of features mentioned above in the description as well as the features and combinations of features mentioned below in the figure description and/or shown solely in the figures can be used not only in the respectively presented combination, but also in other combinations, without leaving the scope of the invention. Accordingly, embodiments of the invention that are not explicitly shown in the figures and explained, but which can be deduced and produced by separate combinations of features from the explained embodiments, are also regarded as being comprised and disclosed. Embodiments and combinations of features that, accordingly, do not have all features of an originally formulated independent claim are also to be regarded as being disclosed. Beyond this, embodiments and combinations of features, in particular by way of the embodiments presented above, that go beyond or depart from the combinations of features presented with reference to the claims are to be regarded as being disclosed. Shown herein are:

FIG. 1: a schematic illustration of a cleaning device of the prior art; and

Figure 2:
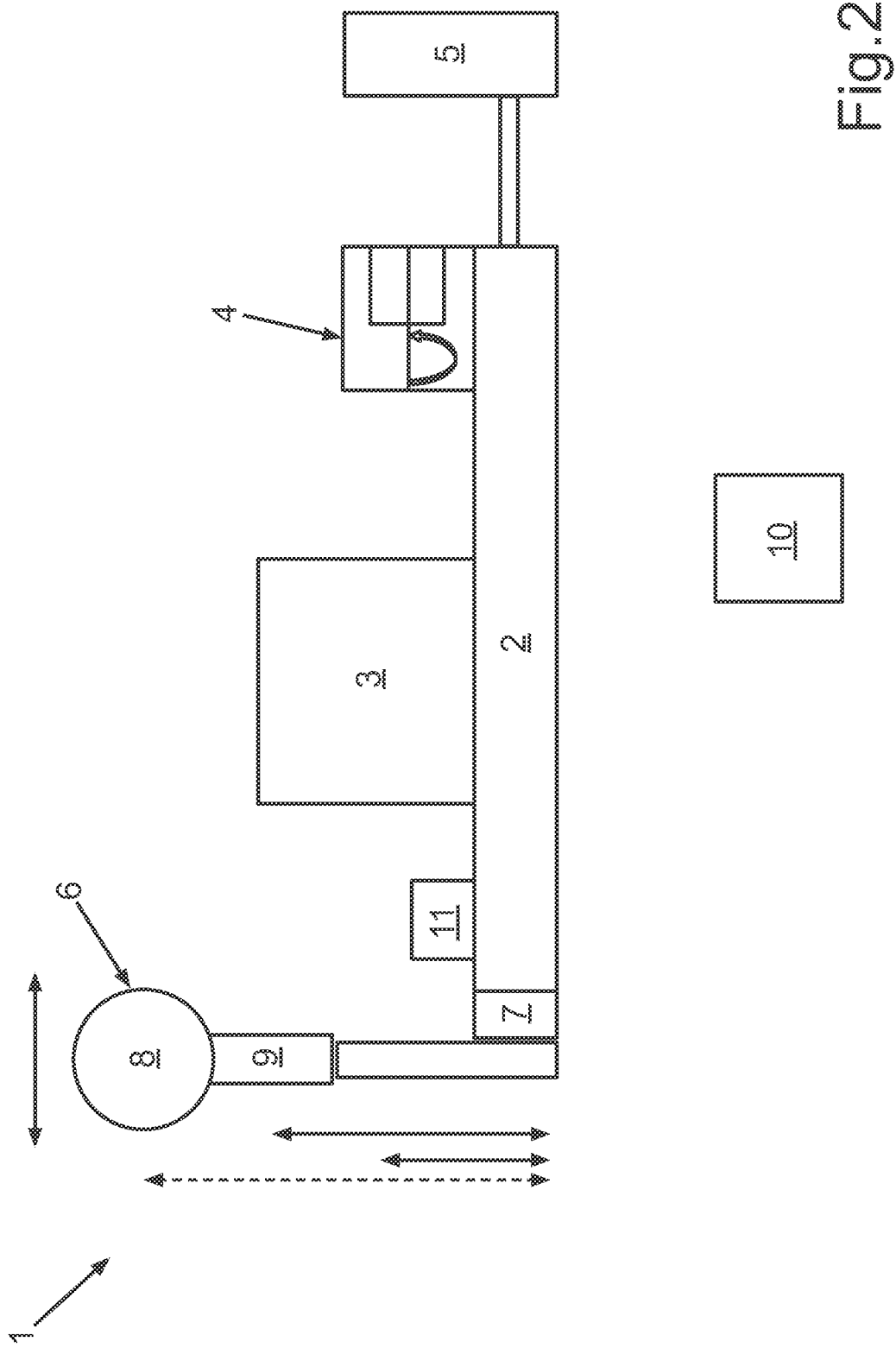

FIG. 2: a schematic illustration of a cleaning device according to the invention.

DESCRIPTION OF THE INVENTION

FIG. 1 shows a cleaning device 1' of the prior art. The cleaning device 1' of the prior art can have a machine plate 2', on which an at least partly additively manufactured component 3' can be arranged. The arrangement can occur, for example, by a bolting, locking, or clamping of the component 3' in the machine plate 2'. In order to clean powder residues away from the component 3', it can be provided that the cleaning device 1' has a vibration actuator 4', which can be designed to excite the machine plate 2' with a predetermined frequency in order to bring about an oscillation of the machine plate 2', which is transmitted onto the component 3'. It can be provided that the excitation of the machine plate 2' by the vibration actuator 4 occurs with a resonant frequency of the machine plate 2' in order to achieve an amplitude that is as great as possible. The resonant frequency of the machine plate 2' can be dependent on the material and/or on the geometry of the machine plate 2', so that is can be predetermined.

The current unbalance excitation (shaking) of the build plate, as a result of which the powder starts to flow and can be shaken away, is carried out by way of an inducer of oscillations, such as, for example, an electric motor with unbalance. This unbalancer is mounted on the machine plate.

The specified geometry of the machine plate 2' results in fixed natural modes and frequencies of the machine plate 2'. In order to increase the acceleration by the unbalancer, an overlap of the exciting frequency with the machine plate frequency is necessary. This makes it necessary to set the frequency of the unbalancer to the machine plate natural frequency. As a result, however, possible natural frequencies (resonances) of the printed component that can lead to damage are excited.

FIG. 2 shows a cleaning device 1 according to the invention. Based on the cleaning device 1 shown in FIG. 1, one possible sequence of a method for avoiding resonance damage during cleaning of the at least partly additively manufactured component 3 is explained. The cleaning device 1 can be provided to carry out a predetermined cleaning process in order to clean powder residues away from the at least partly additively manufactured component 3. It can be provided that the cleaning device 1 has a machine plate 2, in which the component 3 can be arranged. The cleaning device 1 can have a vibration actuator 4, which can be designed to excite the machine plate 2 to oscillation with a predetermined frequency, which is transmitted onto the component 3. In order to make possible thereby a flow of the powder away from the component 3, the cleaning device 1 can have a pivoting apparatus 5, which is designed to clean the machine plate 2 and the at least partly additively manufactured component 3 arranged thereon during the predetermined cleaning process by pivoting the plate around at least one axis in order to make it possible for the powder residues to flow away through openings of the component 3. The vibration actuator 4 can be, for example, an unbalance motor, which comprises an unbalance element, which rotates around an axis of the vibration actuator 4 or swings along a predetermined direction of translation. It can be provided that the excitation shall be produced with a resonant frequency of the machine plate 2. However, it should be avoided here that, as a result thereof, resonance damage is brought about in the component 3. This can be the case, for example, when the excitation provided by the vibration actuator 4 matches a resonant frequency of the component 3. Because the excitation frequency is chosen in such a way that it matches with the resonant frequency of the machine plate 2, it is accordingly necessary to set the resonant frequency of the machine plate 2 to a set resonant frequency that has a greater difference from the at least one resonant frequency of the component 3. For this purpose, it can be provided that the resonant frequency of the machine plate 2 is influenced by the attachment of a mass element 6 on a holding device 7 of the machine plate 2, so that the machine plate 2 has the set resonant frequency. Said mass element can be chosen in such a way that it has a predetermined margin separating it from the at least one resonant frequency of the component 3, as a result of which no or only slight resonances in the component 3 occur at the set resonant frequency. In this way, it is possible to prevent any damage to the component 3.

The mass element 6 can have a predetermined weight and a predetermined geometry as parameters. It is possible, for example, to provide a plurality of mass elements 6, which can have the respective parameters, for attachment to the machine plate 2. These can be arranged, for example, manually on the holding device 7 of the machine plate 2. It can be provided that the mass element 6 can have a movable weight element 8. Such a mass element 6 can have a position of the weight element 8 along a rail as a parameter for setting the resonant frequency. Alternatively to this, it can be provided that the position of the weight element 8 is approached by means of an actuator 9. The actuator 9 can be controlled here by way of a computing unit 10 of the cleaning device 1.

The resonant frequency of the component 3 can be determined, for example, by means of a predetermined computation method and/or simulation method by the computing unit 10 of the cleaning device 1 or by an external computation device. It can also be provided that the resonant frequency is determined experimentally by the cleaning device 1. For this purpose, it is possible, for example, to choose two excitation frequencies or a plurality of excitation frequencies with which the machine plate 2 with the component 3 arranged thereon is excited. A sensor 11, which can comprise, for example, a piezo element, can record, for example, the oscillation induced by the excitation vibration with respective values of resonance parameters. The resonance parameters can comprise, for example, a phase position or an amplitude of the vibration. Depending on the recorded values of the resonance parameters, the computing unit 10 can determine the at least one resonant frequency according to predetermined methods. It can also be provided that the at least one resonant frequency of the at least partly additively manufactured component 3 is determined by the computing unit 10 of the cleaning device 1. In other words, the at least one resonant frequency of the at least partly additively manufactured component 3 can be determined by means of a predetermined computation or simulation method by the computing unit 10 of the cleaning device 1. It can be provided that a digital model of the component 3 is provided at an input interface of the cleaning device 1, from which, by the computing unit 10 of the cleaning device 1 by means of predetermined computation or simulation methods, the at least one resonant frequency of the component 3 can be computed. The digital model can be, for example, the model that was provided for the additive manufacturing of an additive manufacturing device that has manufactured the component 3.

By means of a predetermined selection method, depending on the at least one resonant frequency of the component 3 and on the resonant frequency of the machine plate 2, which can be known and predetermined in the computing unit 10, the set resonant frequency of the machine plate 2 can be determined in order to determine the margin of the resonant frequency of the machine plate 2 that matches the excitation frequency of the vibration actuator 4. The set resonant frequency can have a greater margin separating it from the at least one resonant frequency of the at least partly additively manufactured component 3 than does the resonant frequency of the machine plate 2 without the arranged mass element 6.

In order to set the resonant frequency of the machine plate chosen in the predetermined selection method, it is necessary to determine the parameters of the mass element 6 according to a predetermined ascertaining method depending on the set resonant frequency of the machine plate. This can take place, for example, in the computing unit 10 of the cleaning device 1.

In order to keep open the possibility of overlapping the machine plate frequency and the frequency of the unbalancer without thereby risking resonance with the printed component, an adaptation of the machine plate frequency would be the solution. Accordingly, of the three involved machine pieces (machine plate+unbalancer+printed component), two pieces would be set and tuned to each other.

To this end, on the front face of machine plate, the mass element, "mass plate", having an additional weight can be bolted on. This mass element can be a plate and can be chosen from a set of variable height/width/weight. Accordingly, it is possible to set the machine plate frequencies.

What is claimed is:

1. A method of cleaning powder residues from an at least partly additively manufactured component thereby avoiding resonance damage, the method comprising:
cleaning the powder via a cleaning device, wherein
a machine plate and the at least partly additively manufactured component being arranged thereon are excited to mechanical oscillation with a set resonant frequency of the machine plate during a cleaning process by a vibration actuator of the cleaning device to release the powder residues from the at least partly additively manufactured component, and the machine plate of the cleaning device and the at least partly additively manufactured component arranged thereon are pivoted around at least one axis during the cleaning step by a pivoting apparatus of the cleaning device to cause the powder residues of the at least partly additively manufactured component to flow away, wherein, before carrying out the cleaning process, a resonant frequency of the machine plate is set to the set resonant frequency by arranging a mass element on a securing element of the machine plate, wherein the set resonant frequency is determined according to a predetermined selection method depending on at least one resonant frequency of the component, and the set resonant frequency of the machine plate has a greater margin separating it from the at least one resonance frequency of the at least partly additively manufactured component than does the resonant frequency of the machine plate without the arranged mass element, and at least one parameter of the mass element is ascertained according to a predetermined ascertaining method depending on the set resonant frequency of the machine plate.

2. The method according to claim 1, wherein the at least one resonant frequency of the at least partly additively manufactured component is determined by the cleaning device by a predetermined resonance recording method, wherein the resonance recording method comprises a recording of a respective resonance parameter of the at least partly additively manufactured component by at least one sensor at least at two excitation frequencies of the actuator.

3. The method according to claim 1, wherein the selection method for choosing the set resonant frequency is chosen by the computing unit of the cleaning device.

4. The method according to claim 1, wherein the at least one parameter comprises a position of a weight element, wherein the position of the weight element is set by an actuator of the cleaning device.

5. A cleaning device for cleaning powder residues of an additive layer buildup method away from an at least partly additively manufactured component, wherein the cleaning device is configured and arranged to excite a machine plate and the at least partly additively manufactured component arranged thereon to mechanical oscillation with a set resonant frequency of the machine plate by way of a vibration actuator of the cleaning device during a cleaning process in order to release the powder residues from the at least partly additively manufactured component, and to pivot the machine plate of the cleaning device and the at least partly additively manufactured component arranged thereon around at least one axis by a pivoting apparatus of the cleaning device during the predetermined cleaning process to make it possible for the powder residues to flow away from the at least partly additively manufactured component, wherein the machine plate has a securing element for arranging a mass element for setting the set resonant frequency of the machine plate.

6. A mass element, configured for arrangement on a securing element of a machine plate of a cleaning device for cleaning an at least partly additively manufactured component according to claim 5.

7. The method according to claim 1, wherein the at least partly additively manufactured component is a component of a turbomachine.

8. A cleaning device for cleaning powder residues, of additive layer buildup method, away from an at least partly additively manufactured component of a turbomachine, wherein the cleaning device is configured and arranged to:

excite a machine plate and the at least partly additively manufactured component of a turbomachine arranged thereon to mechanical oscillation with a set resonant frequency of the machine plate by way of a vibration actuator of the cleaning device during a cleaning process in order to release the powder residues from the at least partly additively manufactured component of a turbomachine, and pivot the machine plate of the cleaning device and the at least partly additively manufactured component of a turbomachine arranged thereon around at least one axis by a pivoting apparatus of the cleaning device during the predetermined cleaning process to make it possible for the powder residues to flow away from the at least partly additively manufactured component of a turbomachine, wherein the machine plate has a securing element for arranging a mass element for setting the set resonant frequency of the machine plate.

* * * * *